United States Patent
Takashima et al.

(10) Patent No.: US 12,067,736 B2
(45) Date of Patent: Aug. 20, 2024

(54) WEIGHTED MASK GENERATING APPARATUS, WEIGHTED MASK GENERATING METHOD AND PROGRAM

(71) Applicant: NIPPON TELEGRAPH AND TELEPHONE CORPORATION, Tokyo (JP)

(72) Inventors: Akihiko Takashima, Musashino (JP); Masaaki Matsumura, Musashino (JP); Hajime Noto, Musashino (JP); Hideaki Kimata, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 411 days.

(21) Appl. No.: 17/441,018

(22) PCT Filed: Mar. 11, 2020

(86) PCT No.: PCT/JP2020/010431
§ 371 (c)(1),
(2) Date: Sep. 20, 2021

(87) PCT Pub. No.: WO2020/195810
PCT Pub. Date: Oct. 1, 2020

(65) Prior Publication Data
US 2022/0172383 A1 Jun. 2, 2022

(30) Foreign Application Priority Data

Mar. 26, 2019 (JP) ................................. 2019-059362

(51) Int. Cl.
*G06T 7/33* (2017.01)
*G06T 7/50* (2017.01)
*G06V 40/16* (2022.01)

(52) U.S. Cl.
CPC .................. *G06T 7/33* (2017.01); *G06T 7/50* (2017.01); *G06V 40/171* (2022.01); *G06T 2207/30201* (2013.01)

(58) Field of Classification Search
CPC ... G06T 7/33; G06T 7/50; G06T 2207/30201; G06T 2207/20081; G06T 7/246; G06T 7/73; G06T 2207/20084; G06V 40/171
See application file for complete search history.

(56) References Cited

U.S. PATENT DOCUMENTS

| | | | |
|---|---|---|---|
| 2018/0046854 A1* | 2/2018 | Kittler | G06V 10/60 |
| 2019/0333262 A1* | 10/2019 | Chen | G06V 40/172 |
| 2021/0319621 A1* | 10/2021 | Qiao | G06T 19/20 |

FOREIGN PATENT DOCUMENTS

EP    1650711 A1 *  4/2006  ......... G06K 9/00281

OTHER PUBLICATIONS

Yao Feng et al., Joint 3D Face Reconstruction and Dense Alignment with Position Map Regression Network, ECCV (14) 2018, Sep. 8, 2018, pp. 557-574.

(Continued)

*Primary Examiner* — Andrew W Johns
(74) *Attorney, Agent, or Firm* — Harness, Dickey & Pierce, P.L.C.

(57) ABSTRACT

A unit derives displacement amounts of feature points in an entire region of a face shape. A unit derives separated displacement amounts, each of which is a displacement amount of each feature point for every deformation pattern of a partial region of the face shape, based on the displacement amounts of the feature points in the entire region of the face shape and deformation degrees for every deformation pattern of the partial regions. A unit derives normalized and separated displacement amounts, which are obtained by normalizing the separated displacement amounts, for every deformation pattern of the partial regions. A unit generates (Continued)

weight values of the feature points in the entire region of the face shape based on the normalized and separated displacement amounts for every deformation pattern of the partial regions of the face shape and the deformation degrees for every deformation pattern of the partial regions.

5 Claims, 9 Drawing Sheets

(56) References Cited

OTHER PUBLICATIONS

Xianfeng Gu et al., Geometry Images, ACM Transactions on Graphics (TOG), vol. 21, No. 3, 2002, pp. 355-361.

* cited by examiner

WEIGHTED MASK GENERATING APPARATUS, WEIGHTED MASK GENERATING METHOD AND PROGRAM

CROSS-REFERENCE TO RELATED APPLICATIONS

This application is a 371 U.S. National Phase of International Application No. PCT/JP2020/010431 filed on Mar. 11, 2020, which claims priority to Japanese Application No. 2019-059362 filed on Mar. 26, 2019. The entire disclosures of the above applications are incorporated herein by reference.

TECHNICAL FIELD

The present invention relates to a weight mask generation device, a weight mask generation method, and a program.

BACKGROUND ART

A three-dimensional shape of a face (hereinafter, referred to as a "face shape") may be reconstructed from a two-dimensional image of the face (hereinafter, referred to as a "face image") using a machine learning model (see Non-Patent Literature 1). Face shape data represents feature points (a point group) in a face shape. The feature points in the face shape are, for example, the center point of the pupil, the end point of the eye, and the center point of the nose viewed from the front of the face. A learning model generation device derives estimation data of a face shape from face image data inputted to a machine learning model. The machine learning model is a deep neural network (DNN)-based machine learning model, for example.

Three-dimensional shape data may be stored in a two-dimensional image in a geometry-image data format with the adjacency relationships in the three-dimensional shape maintained (see Non-Patent Literature 2). For example, the correct answer data of the face shape is stored in the two-dimensional image in the geometry-image data format.

In the learning phase of machine learning, the learning model generation device may derive an error in the estimation data of a face shape with respect to the correct answer data of the face shape using a two-dimensional image representing weight values of the feature points in the face shape (hereinafter, referred to as a "weight mask"). The weight mask is generated in advance in the geometry-image data format. In a conventional weight mask, weights are assigned to the respective feature points in the face shape (for example, 68 landmark points) regardless of a change in facial expression (deformation of the face shape). The learning model generation device updates a parameter of the machine learning model with the error back propagation technique based on the error in the estimation data of the face shape with respect to the correct answer data of the face shape.

Figure 8:
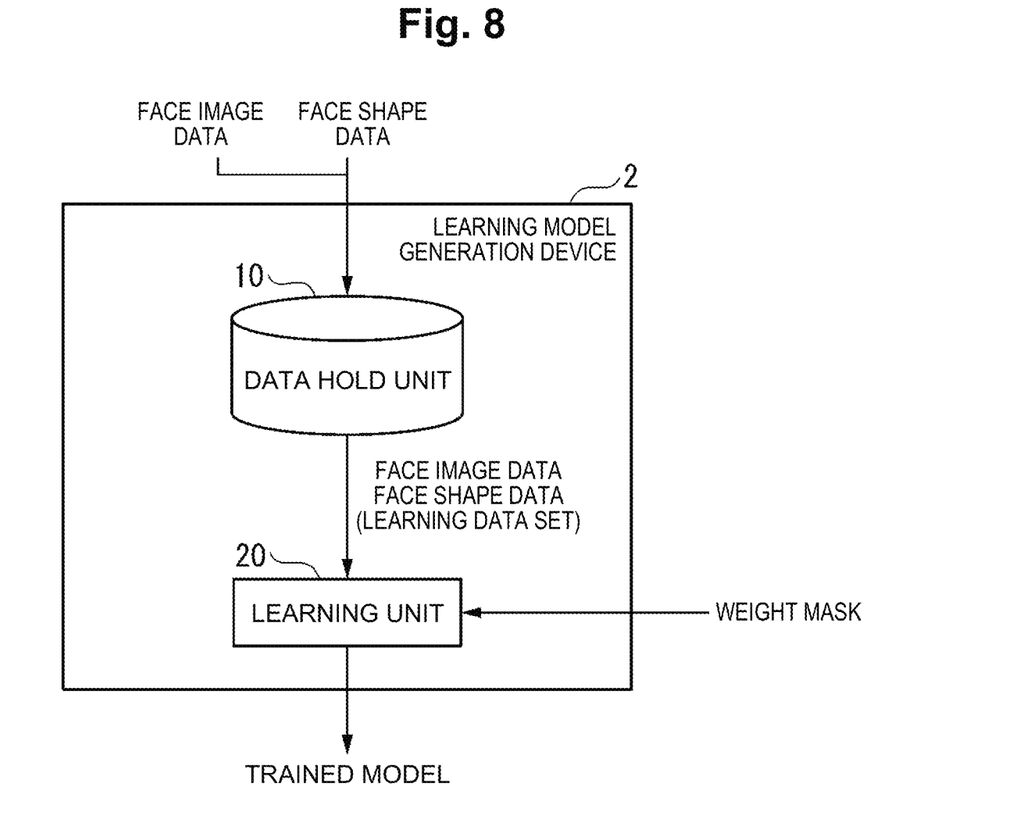
FIG. 8 is a diagram showing an exemplary configuration of a conventional learning model generation device.

FIG. 8 is a diagram showing an exemplary configuration of a conventional learning model generation device. A learning model generation device 2 is a device that generates a trained machine learning model. The learning model generation device 2 includes a data hold unit 10 and a learning unit 20.

The data hold unit 10 holds a combination of face image data and face shape data of a predetermined facial expression, for each facial expression. The feature points in the face shapes are aligned so that the identical feature points in partial regions (parts) of the respective face shapes are stored in the same two-dimensional coordinate point in the face images.

The learning unit 20 acquires the face image data and the face shape data of the predetermined facial expression from the data hold unit 10. The learning unit 20 acquires a weight mask. The learning unit 20 performs machine learning, in which the face image data is inputted and the face shape data of the predetermined facial expression is outputted, using the acquired weight mask. The learning unit 20 thus generates a trained machine learning model.

Figure 9:
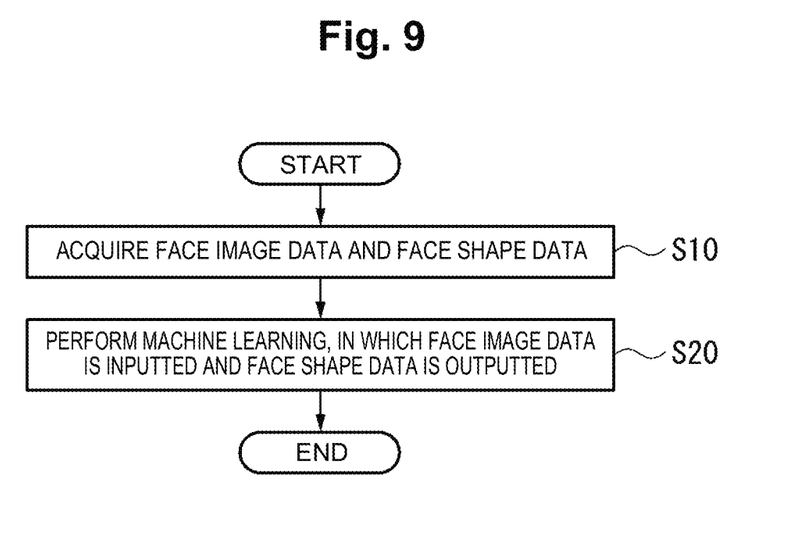
FIG. 9 is a flowchart showing an exemplary operation of the conventional learning model generation device.

FIG. 9 is a flowchart showing an exemplary operation of the learning model generation device 2. The learning unit 20 acquires the face image data and the face shape data from the data hold unit 10 (Step S10). The learning unit 20 performs machine learning, in which the face image data is inputted and the face shape data is outputted, using the acquired weight mask (Step S20).

CITATION LIST

Non-Patent Literature

Non-Patent Literature 1: Yao Feng, Fan Wu, Xiaohu Shao, Yanfeng Wang, Xi Zhou, "Joint 3D Face Reconstruction and Dense Alignment with Position Map Regression Network", ECCV (14) 2018: pp. 557-574.

Non-Patent Literature 2: Gu, X., Gortler, S. J., Hoppe, H., "Geometry images", ACM Transactions on Graphics (TOG) 21(3), 355-361 (2002)

SUMMARY OF THE INVENTION

Technical Problem

A human face includes large-moving partial regions (for example, the mouth) and small-moving partial regions (for example, the eyebrow). If an error between the estimation data of a face shape and the correct answer data of the face shape is large in a partial region of interest to people, the estimated facial expression is different from the actual facial expression. Thus, the conventional weight mask generation device may have a low degree of reproducibility of facial expressions of the face shape reconstructed from the face image.

In view of the above circumstances, it is an object of the present invention to provide a weight mask generation device, a weight mask generation method, and a program, which can improve reproducibility of facial expressions of a face shape reconstructed from a face image.

Means for Solving the Problem

An aspect of the present invention provides a weight mask generation device which includes: a displacement amount derivation unit that derives displacement amounts of feature points in an entire region of a face shape; a separation unit that derives separated displacement amounts, each of which is a displacement amount of each feature point for every deformation pattern of a partial region of the face shape, based on the displacement amounts of the feature points in the entire region of the face shape and deformation degrees for every deformation pattern of the partial regions of the face shape; a normalization unit that derives normalized and separated displacement amounts, which are obtained by normalizing the separated displacement amounts, for every deformation pattern of the partial regions of the face shape;

and a weight value generation unit that generates weight values of the feature points in the entire region of the face shape based on the normalized and separated displacement amounts for every deformation pattern of the partial regions of the face shape and the deformation degrees for every deformation pattern of the partial regions of the face shape.

An aspect of the present invention provides the weight mask generation device which further includes a deformation degree derivation unit that derives the deformation degrees for every deformation pattern of the partial regions of the face shape based on a face image associated with the face shape.

An aspect of the present invention provides the weight mask generation device in which the deformation degree derivation unit derives the deformation degrees for every action unit defined in a standard of Facial Action Coding System.

An aspect of the present invention provides a weight mask generation method executed by a weight mask generation device, the method including: a displacement amount step in which a displacement amount derivation unit of the weight mask generation device derives displacement amounts of feature points in an entire region of a face shape; a separation step in which a separation unit of the weight mask generation device derives separated displacement amounts, each of which is a displacement amount of each feature point for every deformation pattern of a partial region of the face shape, based on the displacement amounts of the feature points in the entire region of the face shape and deformation degrees for every deformation pattern of the partial regions of the face shape; a normalization step in which a normalization unit of the weight mask generation device derives normalized and separated displacement amounts, which are obtained by normalizing the separated displacement amounts, for every deformation pattern of the partial regions of the face shape; and a weight value generation step in which a weight value generation unit of the weight mask generation device generates weight values of the feature points in the entire region of the face shape based on the normalized and separated displacement amounts for every deformation pattern of the partial regions of the face shape and the deformation degrees for every deformation pattern of the partial regions of the face shape.

An aspect of the present invention provides a program that enables a computer to work as the weight mask generation device.

Effects of the Invention

According to the present invention, it is possible to improve the reproducibility of facial expressions of the face shape reconstructed from the face image.

DESCRIPTION OF EMBODIMENTS

Embodiments of the present invention will be described in detail with reference to the accompanying drawings.

A learning model generation device according to an embodiment is an information processing device that generates a trained machine learning model (hereinafter, referred to as a "trained model") based on weight masks. The learning model generation device derives displacement amounts of feature points in an entire region of a face shape (deformation amounts of a face shape), which change in response to a facial expression, for each entire region of the face shape. The learning model generation device derives displacement amounts of the feature points for every deformation pattern of partial regions of the face shape, based on deformation degrees for every deformation pattern (motion pattern) of the partial regions (parts) of the face shape (motion intensities; hereinafter, referred to as "partial motion intensities") and the displacement amounts of the feature points in the entire region of the face shape.

The partial motion intensity is defined for every deformation pattern of the partial region of the face shape that achieves a change in a facial expression. For example, the partial motion intensity is defined as an opening degree (deformation degree) of the eye (part) "2.0" or a raising degree (deformation degree) of the left corner of the mouth (part) "1.5". The opening degree of the eye is defined, for example, in a range from the maximum value "5.0" of the opening degree of the eye for a face shape having a predetermined facial expression to the minimum value "0.0" of the opening degree of the eye for an expressionless face shape.

The learning model generation device normalizes the displacement amounts of the feature points for every deformation pattern of the partial regions of the face shape (hereinafter, referred to as "separated displacement amounts") for the displacement amounts of the feature points, for each partial motion intensity. The learning model generation device performs recombination of the separated displacement amounts which have been normalized (hereinafter, referred to as "normalized and separated displacement amounts") using the partial motion intensities. In other words, the learning model generation device generates weight masks representing the weight values of the feature points in the entire region of the face shape based on the normalized and separated displacement amounts and the partial motion intensities, for each entire region of the face shape. The learning model generation device generates a trained model using the weight masks.

Figure 1:
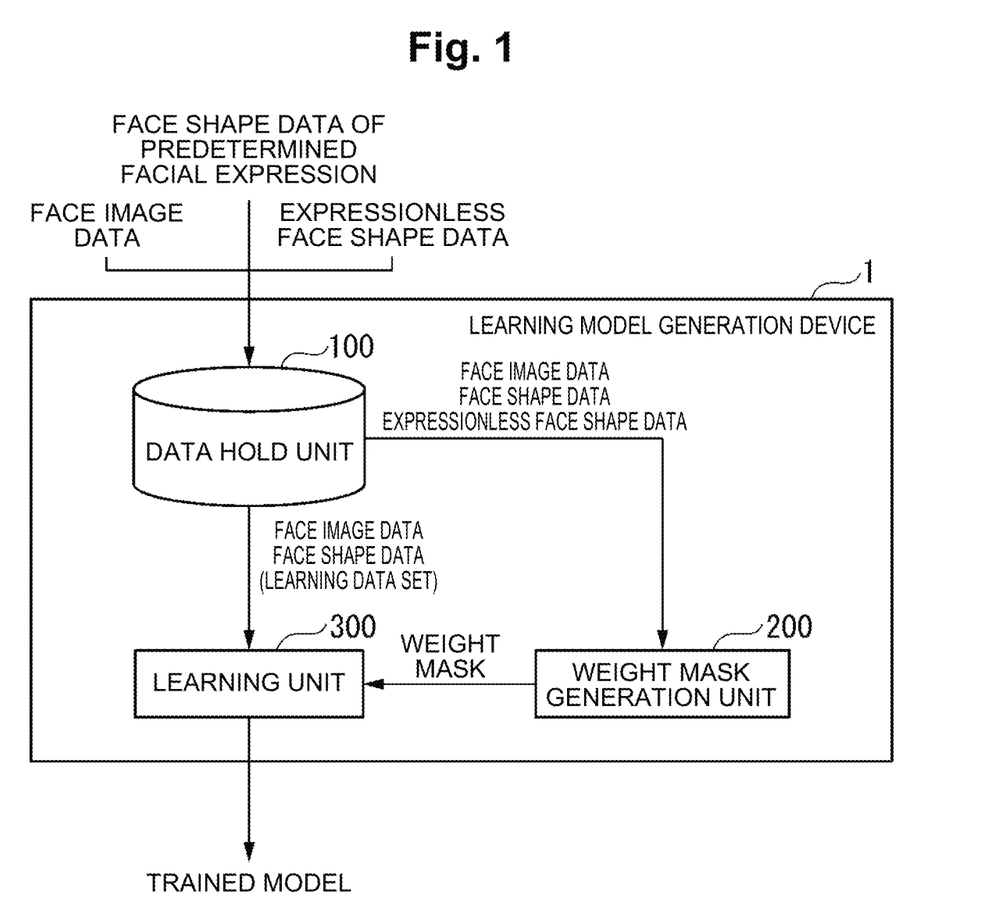
FIG. 1 is a diagram showing an exemplary configuration of a learning model generation device according to an embodiment.

FIG. 1 is a diagram showing an exemplary configuration of a learning model generation device 1. The learning model generation device 1 includes a data hold unit 100, a weight mask generation unit 200, and a learning unit 300. A processor, such as a CPU (Central Processing Unit) or a GPU (Graphics Processing Unit), executes a program stored in a memory, which is a nonvolatile recording medium (non-transitory recording medium), and consequently part or all of the weight mask generation unit 200 and the learning unit 300 is implemented as software. Part or all of the weight mask generation unit 200 and the learning unit 300 may be implemented with hardware such as an LSI (Large Scale Integration) or an FPGA (Field Programmable Gate Array).

The data hold unit 100 may be either of a nonvolatile recording medium (non-transitory recording medium) or a volatile recording medium. The data hold unit 100 holds a combination of face image data and face shape data of a predetermined facial expression as a data set for machine learning (hereinafter, referred to as a "learning data set") for each face shape having a predetermined facial expression. The data hold unit 100 holds expressionless face shape data. The feature points in the face shape are aligned for each face shape so that the identical feature points in the partial regions (parts) of the respective face shapes are stored in the same two-dimensional coordinate point in the face images.

The weight mask generation unit 200 acquires the face image data, the face shape data, and the expressionless face shape data from the data hold unit 100. The weight mask generation unit 200 generates weight masks for each learning data set based on the face image data, the face shape data, and the expressionless face shape data. The two-dimensional coordinates in the weight mask match the two-dimensional coordinates in the face image data. The weight mask generation unit 200 outputs the generated weight masks to the learning unit 300 for each learning data set.

The learning unit 300 performs machine learning, in which the face image data is inputted and the face shape data of the predetermined facial expression is outputted, for each learning data set using the weight masks. The learning unit 300 thus generates a trained model as a result of performing machine learning.

Figure 2:
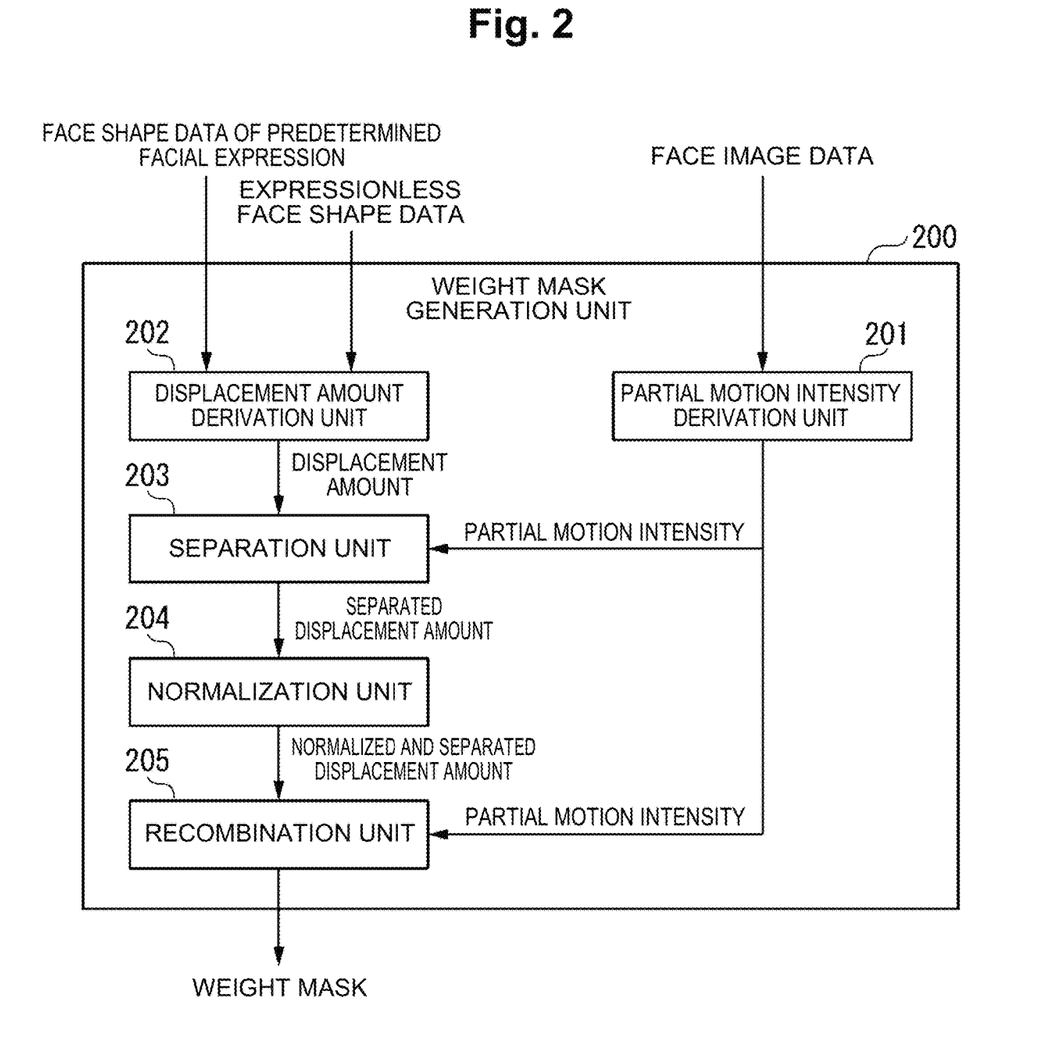
FIG. 2 is a diagram showing an exemplary configuration of a weight mask generation unit according to an embodiment.

Next, an exemplary configuration of the weight mask generation unit 200 is described.

FIG. 2 is a diagram showing an exemplary configuration of the weight mask generation unit 200. The weight mask generation unit 200 is a device that generates weight masks for learning in machine learning. The weight mask generation unit 200 includes a partial motion intensity derivation unit 201, a displacement amount derivation unit 202, a separation unit 203, a normalization unit 204, and a recombination unit 205.

The partial motion intensity derivation unit 201 (deformation degree derivation unit) acquires a plurality of face image data from the data hold unit 100. The entire region of the face image is divided into partial regions (parts) of the face image. The partial motion intensity derivation unit 201 derives partial motion intensities for each of the face image data based on the face image data. The partial motion intensity derivation unit 201 derives the partial motion intensities associated with deformation patterns of the partial regions of the face image, for each of the face image data.

The partial motion intensity is an N-dimensional (N is the number of deformation patterns of a partial region of a face image) vector of intensity data (apparent intensity). The partial motion intensity derivation unit 201 derives the partial motion intensities of the deformation patterns of the respective partial regions. The partial motion intensity derivation unit 201 outputs a plurality of partial motion intensities associated with the entire region (partial regions) of the face image based on the acquired face image data to the separation unit 203 and the recombination unit 205, for each of the face image data.

The deformation pattern of a partial region is a pattern of a specific deformation motion in a partial region (part) of a face image. Examples of the deformation pattern include "a motion of raising the corner of the mouth around the mouth (partial region)", and "a motion of raising the outer eyebrow in the eyebrow (partial region)".

As a position of a feature point in a partial region of the acquired face image gets further from the position of the feature point (associated point) in the partial region of the expressionless face shape, the value of the partial motion intensity is larger. For example, the minimum value "0" of the partial motion intensity indicates that the position of the feature point in the partial region of the acquired face image matches the position of the feature point (associated point) in the partial region of the expressionless face shape.

The partial motion intensity derivation unit 201 derives the partial motion intensity, for example, for every action unit defined for Facial Action Coding System. In the standard for Facial Action Coding System, several tens of action units (AU) are defined as deformation patterns (motion patterns) of partial regions. The action units represent 40 or more minimum units obtained by dividing the facial motion based on anatomical and psychological knowledge. The deformation patterns of the partial regions are expressed, for example, as AU1 "Inner Brow Raiser", AU5 "Upper Lid Raiser", and AU12 "Lip Corner Puller". The deformation degrees of the respective deformation patterns are expressed, for example, as "AU1:1.5" and "AU5:4.2".

Alternatively, a subject watches the face images for the deformation patterns of the partial regions, and then may derive the partial motion intensities of the deformation patterns of the partial regions of interest to the subject based on the subject's subjectivity. In this case, the subject manually inputs the partial motion intensities to the separation unit 203 and the recombination unit 205. The weight mask generation unit 200 does not have to include the partial motion intensity derivation unit 201.

The displacement amount derivation unit 202 acquires a learning data set for each of the face image data from the data hold unit 100. In other words, the displacement amount derivation unit 202 acquires a combination of the face shape data of a predetermined facial expression and the expressionless face shape data, for each of the face image data from the data hold unit 100.

The displacement amount derivation unit 202 executes geometry processing on the three-dimensional coordinates of the feature points in the face shape having the predetermined facial expression. In other words, the displacement amount derivation unit 202 converts the three-dimensional coordinates of the feature points in the face shape having the predetermined facial expression into two-dimensional coordinates on a plane. The displacement amount derivation unit 202 incorporates the face shape data of the predetermined facial expression into the two-dimensional image in a geometry-image data format. The feature points in the face shape having the predetermined facial expression are aligned for each face shape so that the identical feature points in the partial regions (parts) of the respective face shapes are stored in the same two-dimensional coordinate point in the face images. For example, the center point of the nose viewed from the front of the face is aligned for each face shape so that the center point of the nose of each face shape has the same two-dimensional coordinate point.

The displacement amount derivation unit 202 derives displacement amounts of the feature points in the entire region of the face shape, for each learning data set. In other words, the displacement amount derivation unit 202 derives the displacement amounts of the feature points in the entire region of the face shape for each face shape associated with the face image acquired by the partial motion intensity derivation unit 201. The displacement amount derivation unit 202 derives a difference between three-dimensional coordinates of the feature points in the respective face shapes, which have the same two-dimensional coordinate in the face images in the geometry-image data format. In other words, the displacement amount derivation unit 202 derives a difference (a difference in the three-dimensional shape) between the position of the feature point in the expressionless face shape associated with the face image acquired by the partial motion intensity derivation unit 201 and the position of the feature point in the face shape having the predetermined facial expression associated with the face image, as a displacement amount of the feature point in the face shape. The displacement amount derivation unit 202 outputs information on the displacement amounts of the feature points in the face shape having the predetermined facial expression in the geometry-image data format to the separation unit 203.

The separation unit 203 acquires the information on the displacement amounts of the feature points in the face shape for each of the face image data from the displacement amount derivation unit 202. The separation unit 203 acquires information on the partial motion intensities from the partial motion intensity derivation unit 201.

Since the displacement amount of the feature point in the face shape and the partial motion intensity are both generated from the face image data and the face shape data, the displacement amount of the feature point in the face shape and the partial motion intensity are associated with each of the face image data. Since the separation unit 203 derives one separated displacement amount (N-dimensional vector data) for each combination of the displacement amount of the feature point in the face shape and the partial motion intensity, information on the association among the displacement amount of the feature point in the face shape, the partial motion intensity, and the face image data is not essential for the process executed by the separation unit 203.

The separation unit 203 derives the separated displacement amounts based on the displacement amounts of the feature points in the entire region of the face shape and the partial motion intensities. For example, the separation unit 203 derives the separated displacement amounts based on the average of the displacement amounts of the feature points in the entire region of the face shape (average displacement amount) and the average of the partial motion intensities (average intensity vector). The separated displacement amount represents a displacement amount of each feature point in a partial region, when the partial motion intensities of the deformation patterns of the partial region (part) of the face shape are 1. The separated displacement amount is n-dimensional (n is the number of deformation patterns of a partial region of a face shape) vector data. The separation unit 203 derives one separated displacement amount (N-dimensional vector data) for each combination of the displacement amount of the feature point in the face shape and the partial motion intensity.

An example of a method of deriving the separated displacement amount is described.

The separation unit 203 extracts samples each having a component of the partial motion intensity greater than a predetermined threshold "T", that is "v(AUn)>T", for each partial motion intensity "v", from all the learning data sets. Therefore, for an unextracted sample, the partial motion intensity "v" has a component equal to or less than the threshold "T". The threshold value "T" is predetermined for each partial region of the face shape so that a partial motion intensity from which a predetermined facial expression is perceivable can be extracted.

The separation unit 203 derives an average displacement amount "$D_{AU}$", which is an average of the displacement amounts "D" of the feature points in the face shape, and an average intensity vector "$V_{AU}$", which is an average of the partial motion intensity vectors "v", for the extracted samples. The relationship among the average displacement amount "$D_{AU}$", the average intensity vector "$V_{AU}$", and the separated displacement amount "A" is expressed as Expression (1).

[Math. 1]
$$D_{AU} = (v_{AU})A \quad (1)$$

The column vector "$D_v$", in which the average displacement amounts "$D_{AU}$" are arranged in the order of the deformation patterns of the partial region of the face shape (AU1, AU2, . . . ), is expressed as Expression (2).

[Math. 2]
$$D_v = \begin{bmatrix} D_{AU1} \\ D_{AU2} \\ \vdots \\ D_{AUx} \end{bmatrix} = \begin{bmatrix} v_{AU1} \\ v_{AU2} \\ \vdots \\ v_{AUx} \end{bmatrix} A \quad (2)$$

Figure 3:
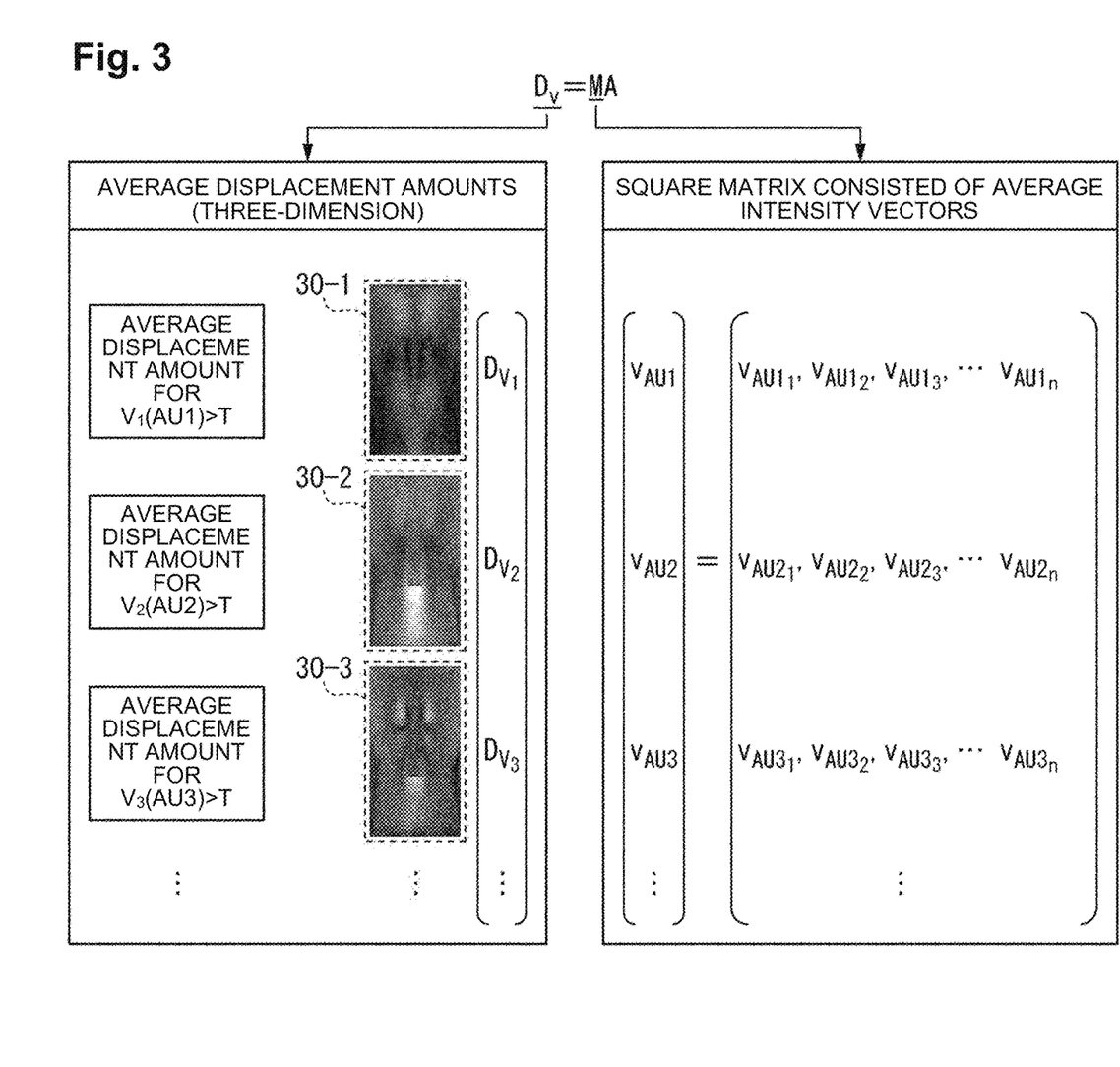
FIG. 3 is a diagram showing an example of average displacement amounts and a square matrix according to an embodiment.

FIG. 3 is a diagram showing an example of the average displacement amounts "$D_{AU}$" and a square matrix "M". Each of "$v_{AU1}$" to "$v_{AUx}$" on the right side of Expression (2) is a column vector. Therefore, when the column vectors are expanded as components of the row vector, "$v_{AU1}$" to "$v_{AUx}$" on the right side of Expression (2) form a diagonally dominant square matrix "M" having a size of (n×n). Then, the separation unit 203 applies the inverse matrix "$M^{-1}$" to the column vector "$D_v$" to derive the separated displacement amount "A" defined for each partial motion intensity "v" as Expression (3).

[Math. 3]
$$A = M^{-1} D_v \quad (3)$$

The separated displacement amount "A" can be applied to any face shape. FIG. 3 shows exemplary weight masks 30, each representing the three-dimensional average displacement amounts "$D_{AU}$" (weighting) for respective feature points in the face shape, for each average intensity vector "$V_{AU}$". In the weight mask 30, as the feature point gets a larger three-dimensional average displacement amount "$D_{AU}$", the feature point is represented with a brighter color. The separation unit 203 outputs the separated displacement amounts "A", each of which is N-dimensional vector data, to the normalization unit 204.

The normalization unit 204 acquires the separated displacement amounts "A" from the separation unit 203. For example, the normalization unit 204 derives the maximum value of the components of the separated displacement amounts "A" for each deformation pattern of the partial region of the face shape. The normalization unit 204 divides the separated displacement amounts "A" by the derived maximum values.

In this way, the normalization unit 204 normalizes the components of the separated displacement amounts "A", each of which is N-dimensional vector data, to generate the normalized and separated displacement amounts. The normalized and separated displacement amount is N-dimensional vector data. The normalization unit 204 outputs the normalized and separated displacement amounts to the recombination unit 205.

The recombination unit 205 (weight value generation unit) acquires the normalized and separated displacement amounts from the normalization unit 204. The recombination unit 205 acquires information on the partial motion intensities from the partial motion intensity derivation unit 201 for each of the face image data. The recombination unit 205 generates weight values of the feature points in the entire region of the face shape based on the normalized and separated displacement amounts and the partial motion intensities. In other words, the recombination unit 205 performs recombination of the normalized and separated displacement amounts by deriving the products of the normalized and separated displacement amounts and the partial motion intensities associated with each face image.

The recombination unit 205 performs recombination of the normalized and separated displacement amounts, for example, by linearly combining the normalized and separated displacement amounts and the partial motion intensities associated with each face image. The recombination unit 205 may perform recombination of the normalized and separated displacement amounts, for example, by applying a predetermined nonlinear function to the normalized and separated displacement amounts and using the results and the partial motion intensities associated with each face image as a basis.

The recombination unit 205 generates weight masks for each of the face image data through the recombination of the normalized and separated displacement amounts for all the partial motion intensities derived based on the face image data. The recombination unit 205 outputs the generated weight masks for each of the face image data.

Figure 4:
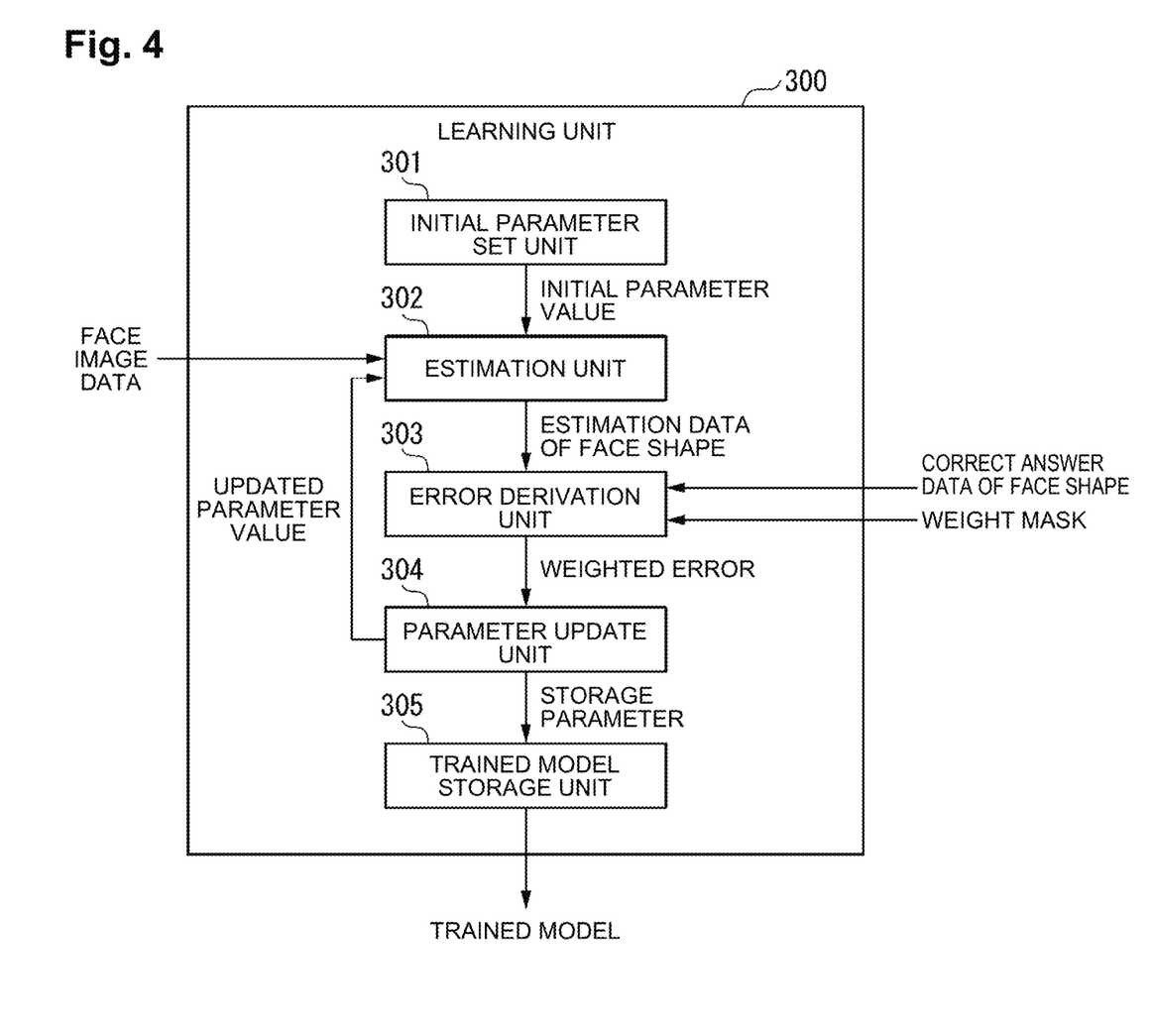
FIG. 4 is a diagram showing an exemplary configuration of a learning unit according to an embodiment.

Next, an exemplary configuration of the learning unit 300 is described.

FIG. 4 is a diagram showing an exemplary configuration of the learning unit 300. The learning unit 300 includes an initial parameter set unit 301, an estimation unit 302, an error derivation unit 303, a parameter update unit 304, and a trained model storage unit 305.

The initial parameter set unit 301, for example randomly, determines an initial parameter value of the model for the neural network-based machine learning. The initial parameter set unit 301 outputs the determined initial parameter value to the estimation unit 302.

The estimation unit 302 acquires the initial parameter value from the initial parameter set unit 301. When the estimation unit 302 acquires the initial parameter value, the estimation unit 302 sets the initial parameter value to the neural network-based trained model.

The estimation unit 302 acquires a combination of the face image data and the face shape data of a predetermined facial expression as a learning data set from the data hold unit 100. The estimation unit 302 acquires an updated parameter value from the parameter update unit 304. When the estimation unit 302 acquires the updated parameter value, the estimation unit 302 sets the updated parameter value to the neural network-based trained model.

The estimation unit 302 inputs the face image data to the neural network-based trained model. The estimation unit 302 executes estimation processing, in which the face image data is inputted and estimation data of the face shape is outputted, using the trained model. In other words, the estimation unit 302 derives the estimation data of the face shape from the face image data using the trained model. In this way, the estimation unit 302 estimates the face shape. The estimation unit 302 outputs the estimation data of the face shape and the correct answer data of the face shape associated with the estimation data of the face shape to the error derivation unit 303.

The error derivation unit 303 acquires the estimation data of the face shape and the correct answer data of the face shape associated with the estimation data of the face shape from the estimation unit 302. The error derivation unit 303 acquires the weight masks associated with the correct answer data of the face shape from the weight mask generation unit 200. The error derivation unit 303 derives absolute errors in the estimation data of the face shape with respect to the correct answer data of the face shape for the respective three-dimensional coordinate points in the face shape stored in the same two-dimensional coordinate point in the geometry-image data format.

The error derivation unit 303 derives a weighted error between the estimation data of the face shape and the correct answer data of the face shape based on the derived absolute errors. In other words, the error derivation unit 303 multiplies the derived absolute errors and the weight values of the two-dimensional coordinate points (feature points) in the weight mask, for respective feature points in the entire region of the face shape. The error derivation unit 303 derives an average of the results, obtained by multiplying the absolute errors and the weight values, as a weighted error (average absolute error) in the entire region of the face shape.

In this way, the error derivation unit 303 derives the weighted error in the estimation data of the face shape with respect to the correct answer data of the face shape using the weight masks in the learning phase of machine learning. The error derivation unit 303 outputs information on the weighted error to the parameter update unit 304.

The parameter update unit 304 acquires the information on the weighted error from the error derivation unit 303. The parameter update unit 304 updates the parameter of the machine learning model by applying the error back propagation technique to the weighted error. The parameter update unit 304 outputs the updated parameter value to the estimation unit 302.

The parameter update unit 304 may output the updated parameter value to the trained model storage unit 305 as a storage parameter. The storage parameter is used as a parameter for a new trained model.

The trained model storage unit 305 stores the storage parameter. The trained model storage unit 305 generates a new trained model using the storage parameter. The trained model storage unit 305 outputs the new trained model to a predetermined external device.

Figure 5:
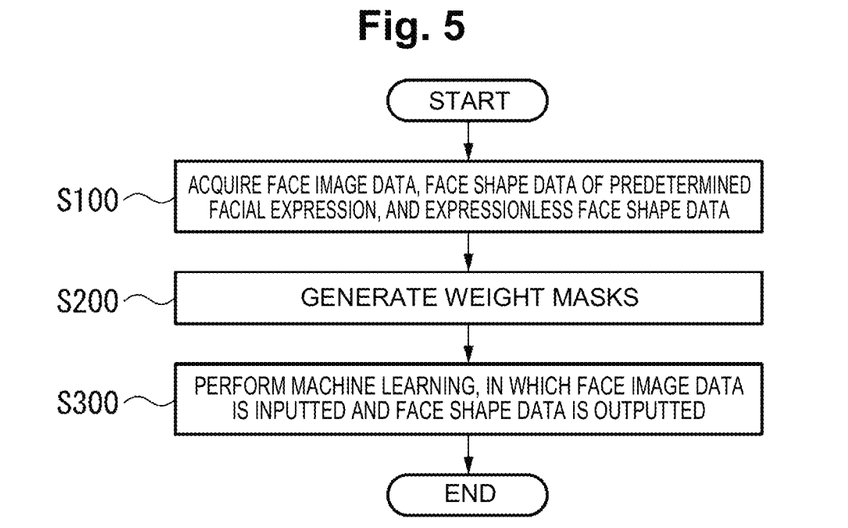
FIG. 5 is a flowchart showing an exemplary operation of the learning model generation device according to an embodiment.

Next, an operation example of the learning model generation device 1 is described.

FIG. 5 is a flowchart showing an exemplary operation of the learning model generation device 1. The learning model generation device 1 acquires a combination of the face image data, the face shape data of a predetermined facial expression, and the expressionless face shape data (Step S100). The learning model generation device 1 generates the weight masks for each learning data set (Step S200). The learning model generation device 1 performs machine learning, in which the face image data is inputted and the face shape data is outputted, using the weight masks (Step S300). A new trained model is generated using the parameter derived as a result of the machine learning.

Figure 6:
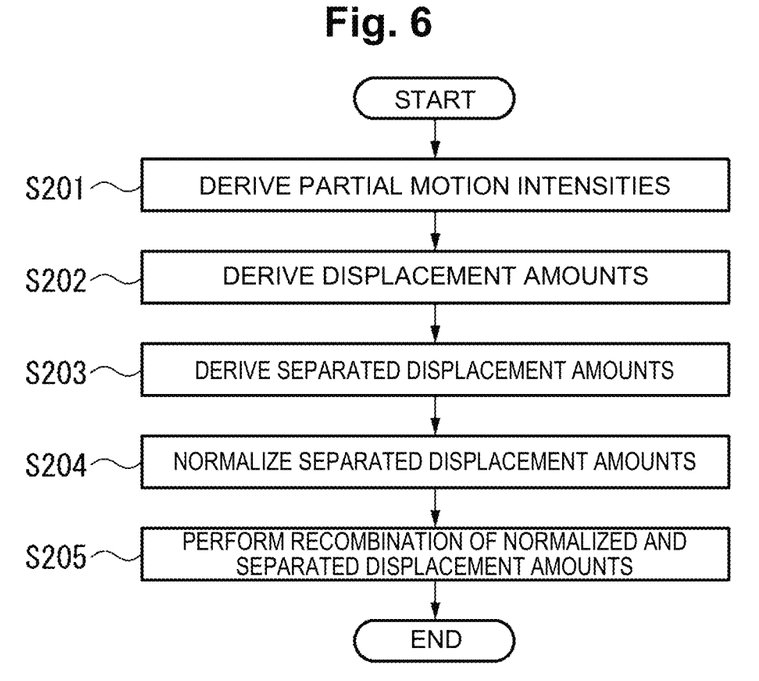
FIG. 6 is a flowchart showing an exemplary operation of the weight mask generation unit according to an embodiment.

Next, an operation example of the weight mask generation unit 200 is described.

FIG. 6 is a flowchart showing an exemplary operation of the weight mask generation unit 200. The partial motion intensity derivation unit 201 derives a plurality of partial motion intensities associated with respective partial regions of the face image for each of the face image data (Step S201). The displacement amount derivation unit 202 derives the displacement amounts of the feature points in the entire region of the face shape for each learning data set (Step S202). The separation unit 203 derives the separated displacement amounts based on the displacement amounts of the feature points in the entire region of the face shape and the partial motion intensities (Step S203). The normalization unit 204 normalizes the components of the separated displacement amounts (Step S204). The recombination unit 205 performs recombination of the normalized and separated displacement amounts using the partial motion intensities (Step S205). The weight masks are then generated.

Figure 7:
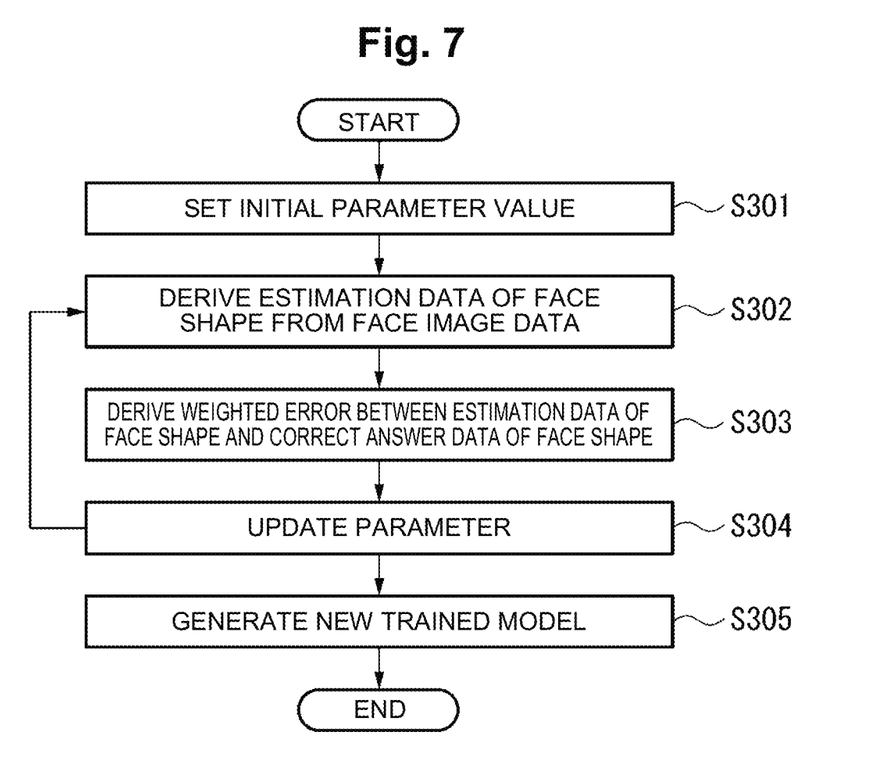
FIG. 7 is a flowchart showing an exemplary operation of the learning unit according to an embodiment.

Next, an exemplary operation of the learning unit 300 is described.

FIG. 7 is a flowchart showing an exemplary operation of the learning unit 300. The estimation unit 302 sets an initial parameter value to the neural network-based trained model (Step S301). The estimation unit 302 derives estimation data of the face shape from the face image data (Step S302). The error derivation unit 303 derives a weighted error between the estimation data of the face shape and the correct answer data of the face shape based on the derived absolute errors (Step S303). The parameter update unit 304 updates the parameter of the machine learning model based on the weighted error. The estimation unit 302 performs Step S302 again (Step S304). The trained model storage unit 305 generates a new trained model using a storage parameter (Step S305).

As described above, the weight mask generation unit 200 (weight mask generation device) according to the embodiment includes the displacement amount derivation unit 202, the separation unit 203, the normalization unit 204, and the recombination unit 205 (weight value generation unit). The displacement amount derivation unit 202 derives the displacement amounts "D" of the feature points in the entire region of the face shape. The separation unit 203 derives the separated displacement amounts "A" based on the displacement amounts of the feature points in the entire region of the face shape (for example, the average of the displacement amounts "$D_{AU}$") and the deformation degrees for every deformation pattern of the partial regions of the face shape (partial motion intensities) (for example, the average of the deformation degrees "$v_{AU}$"). Here, the separated displacement amount is a displacement amount of each feature point for every deformation pattern of the partial region of the face shape. The normalization unit 204 derives the normalized and separated displacement amounts, which are obtained by normalizing the separated displacement amounts, for every deformation pattern of the partial regions of the face shape. The recombination unit 205 generates the weight values of the feature points in the entire region of the face shape as the weight masks, based on the normalized and separated displacement amounts for every deformation pattern of the partial regions of the face shape and the deformation degrees for every deformation pattern of the partial regions of the face shape (partial motion intensities).

In this way, the weight mask generation unit 200 generates the weight values of the motions of the parts (partial motion intensities) regardless of the magnitudes of the motions of the parts in the entire region of the face. The weight mask generation unit 200 predominantly learns the face parts of interest to people regarding to facial expressions. The weight mask generation unit 200 reduces errors between the estimation data of the face shape and the correct answer data of the face shape in such parts. Thus, the weight mask generation unit 200 of the embodiment can improve the reproducibility of facial expressions of the face shape reconstructed from the face image. In other words, a three-dimensional face shape close to the actual facial expression can be reconstructed.

Although a subject may derive the partial motion intensities based on the subject's subjectivity, the weight mask generation unit 200 (weight mask generation device) may further include the partial motion intensity derivation unit 201. The partial motion intensity derivation unit 201 (deformation degree derivation unit) derives the partial motion intensities based on the face image associated with the face shape. The partial motion intensity derivation unit 201 derives the partial motion intensity, for example, for every action unit defined in the standard of Facial Action Coding System.

Although the embodiments of the present invention have been described in detail with reference to the accompanying drawings, a specific configuration is not limited to the embodiments, and the design and the like within a range not departing from the gist of the present invention are also included in the scope of the present invention.

INDUSTRIAL APPLICABILITY

The present invention is applicable to devices for generating weight masks for machine learning, and devices for generating three-dimensional shape data.

REFERENCE SIGNS LIST 1 learning model generation device
2 learning model generation device
10 data hold unit
20 learning unit
30 weight mask
100 data hold unit
200 weight mask generation unit
201 partial motion intensity derivation unit
202 displacement amount derivation unit
203 separation unit
204 normalization unit
205 recombination unit
300 learning unit
301 initial parameter set unit
302 estimation unit
303 error derivation unit
304 parameter update unit
305 trained model storage unit

The invention claimed is:
1. A weight mask generation device, comprising:
a processor; and a storage medium having computer program instructions stored thereon, when executed by the processor, perform to:
- derive displacement amounts of feature points in an entire region of a face shape;
- derive separated displacement amounts, each of which is a displacement amount of each feature point for every deformation pattern of a partial region of the face shape, based on the displacement amounts of the feature points in the entire region of the face shape and deformation degrees for every deformation pattern of the partial regions of the face shape;
- derive normalized and separated displacement amounts, which are obtained by normalizing the separated displacement amounts, for every deformation pattern of the partial regions of the face shape; and
- generate weight values of the feature points in the entire region of the face shape based on the normalized and separated displacement amounts for every deformation pattern of the partial regions of the face shape and the deformation degrees for every deformation pattern of the partial regions of the face shape.

2. The weight mask generation device according to claim 1, wherein the computer program instructions further perform to derive the deformation degrees for every deformation pattern of the partial regions of the face shape based on a face image associated with the face shape.

3. The weight mask generation device according to claim 2, wherein the computer program instructions further perform to derive the deformation degrees for every action unit defined in a standard of Facial Action Coding System.

4. A non-transitory computer-readable medium having computer-executable instructions that, upon execution of the instructions by a processor of a computer, cause the computer to function as the weight mask generation device according to claim 1.

5. A weight mask generation method executed by a weight mask generation device, the method comprising:
- a displacement amount step in which a displacement amount derivation unit of the weight mask generation device displacement amounts of feature points in an entire region of a face shape;
- a separation step in which a separation unit of the weight mask generation device separated displacement amounts, each of which is a displacement amount of each feature point for every deformation pattern of a partial region of the face shape, based on the displacement amounts of the feature points in the entire region of the face shape and deformation degrees for every deformation pattern of the partial regions of the face shape;
- a normalization step in which a normalization unit of the weight mask generation device normalized and separated displacement amounts, which are obtained by normalizing the separated displacement amounts, for every deformation pattern of the partial regions of the face shape; and
- a weight value generation step in which a weight value generation unit of the weight mask generation device generates weight values of the feature points in the entire region of the face shape based on the normalized and separated displacement amounts for every deformation pattern of the partial regions of the face shape and the deformation degrees for every deformation pattern of the partial regions of the face shape.

* * * * *